United States Patent [19]
Kagebeck

[11] Patent Number: 5,525,004
[45] Date of Patent: Jun. 11, 1996

[54] TOOTHED BELT ATTACHMENT

[75] Inventor: Tor Kagebeck, Linköping, Sweden

[73] Assignee: ICL System AB, Kista, Sweden

[21] Appl. No.: 295,633

[22] PCT Filed: Feb. 24, 1993

[86] PCT No.: PCT/SE95/00153

§ 371 Date: Aug. 25, 1994

§ 102(e) Date: Aug. 25, 1994

[87] PCT Pub. No.: WO93/17257

PCT Pub. Date: Sep. 2, 1993

[30] Foreign Application Priority Data

Feb. 28, 1992 [SE] Sweden ................. 9200606

[51] Int. Cl.⁶ ........................................... B41J 1/20
[52] U.S. Cl. .................. 403/293; 403/292; 101/111; 101/DIG. 48
[58] Field of Search ..................... 101/111, 105, 101/DIG. 48; 24/308, 198; 403/294, 291, 331, 292, 293

[56] References Cited

U.S. PATENT DOCUMENTS

| 3,638,565 | 2/1972 | Drejza ............... 101/111 |
| 3,824,654 | 7/1974 | Takabayashi ........... 24/198 |

FOREIGN PATENT DOCUMENTS

| 508037 | 1/1955 | Italy ................ 24/198 |
| 372975 | 5/1932 | United Kingdom ....... 24/198 |

Primary Examiner—Anthony Knight
Attorney, Agent, or Firm—Lee, Mann, Smith, McWilliams, Sweeney & Ohlson

[57] ABSTRACT

The invention relates to an attachment for securing an end-part of a toothed belt-element (12, 14) to a machine element (10). The machine element (10) has a slot (18, 16) for receiving an end-part of the belt-element. Arranged on at least one of the opposing walls of the slot is at least one gripping bar (22, 28) which projects into the slot and the cross-sectional shape of which corresponds generally to the cross-sectional shape of a tooth-space formed recess (24, 30) in the end-part (14a, 12a) of the belt element.

3 Claims, 1 Drawing Sheet

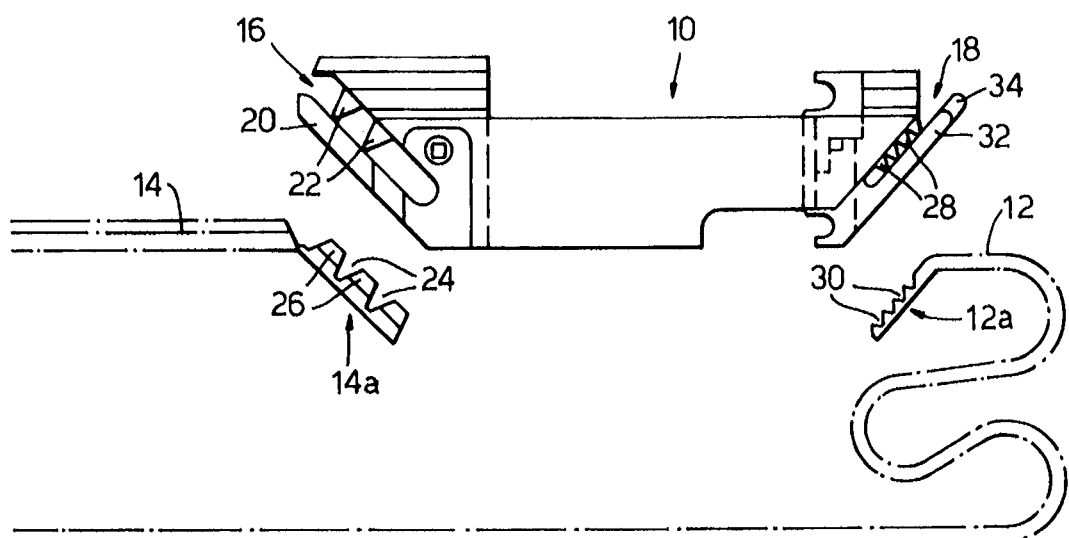

TOOTHED BELT ATTACHMENT

The present invention relates to a device for fastening one end-part of at least one toothed belt-element to a machine element which has at least one slot through which one end-part of the belt-element is intended to be inserted and secured and the distance between the walls of which slot correspond generally to the thickness of the belt-element.

When fastening toothed belt-elements to a machine part, for instance to a slide which is intended to movably support a read head in printing equipment, the end-part of the belt-element has previously been secured to the slide by passing said end through a slot and then securing said end with the aid of a screw which is inserted through the slot and through a hole in the belt-element and then screwed into a threaded hole in the slide. This belt-securing technique requires the provision of a hole in the end of the belt and also the provision of a screw-threaded hole in the slide, and also requires manual tightening of the fastener screw.

An object of the present invention is to provide a simpler and quicker method of securing a toothed belt-element to a machine element without requiring the provision of additional fastener elements.

This object is achieved with a belt attachment device of the aforedescribed kind which is characterized in that at least one of the opposing walls of the slot has at least one gripping bar which projects into the slot and the cross-sectional shape of which corresponds generally to the cross-sectional shape of a tooth-space formed recess in the end-part of the belt-element. A slot of this configuration will enable the end-part of the toothed belt-element to be readily inserted into the slot from either side thereof, i.e. transversely to the length direction of the belt-element, such that the gripping bar or bars will be placed in or inserted in tooth-space formed recesses between the projections on the end-part of the belt-element, said projections having the form of rack teeth, so as to obtain a clamping fit between the belt-end and the slot walls. In this regard, at least one wall of the slot is conveniently formed by one side wall of a tongue-like leg which is configured to exert on the end-part of the belt-element inserted in the slot a clamping force directed which acts in a direction towards the other side of the slot. Furthermore, it is preferred that several gripping bars are disposed on the slot wall at a mutual distance apart which corresponds to the division or pitch of the toothed slots on the belt-element, so as to ensure that a strong and stable belt-element attachment will be ensured.

Each slot may be provided with abutment means for restricting lateral movement of the belt-element in the attachment device.

The invention will now be described in more detail with reference to the accompanying drawing, which is a side view illustrating a machine element having an inventive toothed belt attachment at each end of the machine element, prior to fitting the respective toothed belts together.

The illustrated machine element is a reciprocatingly movable slide 10 which is intended to carry a read head (not shown) in a printer unit. The slide 10 is driven by a toothed belt 12 which is connected at a location (not shown) with a broader belt-element 14 which has generally the form of a toothed belt and which, at the same time, forms a jalousie-like belt which is intended to cover a read gap for the read head in an inoperative, parking position of the slide 10. The belt 14 and the belt 12 thus form a closed loop with the slide 10.

In order to enable the belt 14 to be attached to the belt 12 quickly and simply without requiring additional fastener elements, the slide 10 is provided with a slot 16, 18 at each end of the slide. The slide 16 has a wall which is defined by a tongue-like leg 20, and an opposing wall which includes two gripping bars 22 which project into the slot 16. The spacing of the gripping bars 22 and their cross-sectional shapes correspond to the cross-sectional shapes and the pitch of the tooth interspaces 24 located between teeth-forming rib elements 26 on the belt-element 14. The distance between the opposing walls of the slot 16 corresponds generally to the thickness of the belt 14. Thus, when securing the belt 14 in the slot 16, the end-part 14a is inserted from one side-opening of the slot 16, i.e. in a direction transversely to the length direction of the belt 14, wherewith the gripping bars 22 slide into the tooth spaces 24 with a close fit. The intrinsic resilience of the material of the leg 20 is also utilized to positively hold and secure the belt-end 14a in its inserted position in the slot 16.

Similarly, the other slot 18 intended for the drive belt 12 includes a plurality of gripping bars 28 on one wall of the slot, the cross-sectional shape and the mutual spacing of these bars corresponding to the cross-sectional shape and the pitch for mutual spacing of the tooth interspaces 30 of the toothed belt 12. A tongue 32 defines the other wall of the slot 18 and exerts an adequate clamping force on the end-part 12a of the toothed belt 12 when said end-part is inserted into the slot 18 from one side thereof.

Each of the slots 16, 18 may be provided with suitable abutment means for restricting lateral movement of the belt-element and toothed belt-element 14, 12 in the attachment 10. In the illustrated embodiment, the tongue 32 is provided with two upwardly projecting side-legs 34 between which the toothed belt 12 is guided.

I claim:

1. A device for attaching an end-part of at least one toothed belt-element to a machine element which has at least one slot in which the end-part of the belt-element is intended to be inserted and secured, and where the distance between the opposing walls of the slot generally corresponds to the thickness of the belt-element, characterized in that at least one of the opposing walls of the slot includes at least one gripping bar which projects into the slot and the cross-sectional shape of which corresponds generally to the cross-sectional shape of a tooth-space formed recess in the belt-element end-part, in that at least one wall of the slot forms one side-wall of a tongue-like leg which is configured to exert on the end-part of the belt-element inserted in said slot a clamping force which acts in a direction towards the other wall of the slot and in that the slot is such that the belt-element end-part can be inserted into the slot in s direction transverse to the length of the belt-element.

2. A device according to claim 1, characterized in that a plurality of gripping bars are disposed on the said at least one slot wall at a mutual spacing which corresponds to the pitch or division of the tooth spaces on the belt-element respectively.

3. A device according to claim 1, characterized in that the slot includes abutment means which function to limit lateral movement of the belt-element in said device.

* * * * *